(12) United States Patent
Johnson

(10) Patent No.: US 6,185,916 B1
(45) Date of Patent: Feb. 13, 2001

(54) DOUBLE-HEADED VEGETATION TRIMMER

(76) Inventor: Jay Johnson, Rte. 1, 40, Haywood, VA (US) 22722

( * ) Notice: Under 35 U.S.C. 154(b), the term of this patent shall be extended for 0 days.

(21) Appl. No.: 09/399,757

(22) Filed: Sep. 21, 1999

Related U.S. Application Data

(60) Provisional application No. 60/101,252, filed on Sep. 21, 1998.

(51) Int. Cl.$^7$ .................................................... A01B 34/68
(52) U.S. Cl. .............................. 56/12.7; 56/16.7; 56/17.5
(58) Field of Search ..................... 56/12.1, 12.7, 56/16.7, 16.9, 17.5, 10.8, 15.4; 30/276; 280/62, 63, 64

(56) References Cited

U.S. PATENT DOCUMENTS

| 4,335,567 | * | 6/1982  | Comer ................................. 56/12.7 |
| 4,571,831 | * | 2/1986  | White, III ............................. 30/276 |
| 4,703,613 | * | 11/1987 | Raymond ............................ 56/12.7 |
| 4,905,465 | * | 3/1990  | Jones et al. ...................... 56/12.7 X |
| 5,313,770 | * | 5/1994  | Smothers ............................. 56/12.7 |
| 5,577,374 | * | 11/1996 | Huston ................................ 56/12.1 |
| 5,640,837 |   | 6/1997  | Ueyama . |
| 5,659,958 |   | 8/1997  | Goings . |
| 5,701,728 |   | 12/1997 | Koka et al. . |
| 5,713,191 |   | 2/1998  | Welton . |
| 5,771,670 |   | 6/1998  | Perry . |
| 5,862,655 | * | 1/1999  | Altamirano et al. ................ 56/12.1 |

OTHER PUBLICATIONS

Brochure, Country Home Products, 1998, Introducing the DR Trimmer/Mower.

* cited by examiner

Primary Examiner—Robert E. Pezzuto
(74) Attorney, Agent, or Firm—Keil & Weinkauf

(57) ABSTRACT

A vegetation trimmer apparatus with two rotary cutting heads. In a preferred embodiment, a left arm and a right arm protrude forward from the main body of the trimmer, thereby creating a void between the arms. The apparatus easily cuts around fence posts and small trees when the operator maneuvers the apparatus such that one head passes on each side of the object to be cut around. The apparatus comprises one or more, preferably flexible, cutting members attached to a whirling disk at each head.

12 Claims, 3 Drawing Sheets

DOUBLE-HEADED VEGETATION TRIMMER

The present application claims priority to U.S. provisional application serial No. 60/101,252 filed Sep. 21, 1998, the entire specification of which is hereby incorporated by reference.

BACKGROUND OF THE INVENTION

1. Field of the Invention

The invention is an apparatus for trimming grass, weeds, and other vegetation. Desirable qualities of such trimmers include maneuverability to cut around obstacles such as fence posts or trees, robustness to cut thick vegetation, durability, and ease of operation to facilitate use by persons of limited physical abilities. The present inventive apparatus possesses these qualities to an extent unequaled by any prior known device.

2. Description of Related Art

U.S. Pat. No. 5,771,670 to Perry and the brochure entitled "Introducing the DR® TRIMMER/MOWER™" describe a balanced-wheeled grass and weed trimmer with a single cutting head.

U.S. Pat. No. 5,713,191 to Welton describes a cutting head for a string trimmer with a whirling disk having a plurality of heavy gauge flexible members attached thereto.

The relevant teachings of these three references are hereby incorporated by reference.

SUMMARY OF THE INVENTION

The present invention comprises a vegetation trimmer apparatus with two rotary cutting heads. This provides numerous operating advantages. The apparatus easily cuts around fence posts and small trees when the operator maneuvers the apparatus such that one head passes on each side of the object to be cut around. The apparatus then cuts the grass and weeds 360 degrees around the fence post or small tree with only one motion rather than four or five required by existing machines. Additionally, the apparatus cuts a wide path approximately twice as wide and faster than known trimmers when moving in the forward direction. This allows the wheels to roll over vegetation that has already been cut, rather than potentially tall vegetation that may hinder movement. Similarly, this also allows greater ease when cutting along a boundary, in particular an irregularly shaped boundary, because the side wheel does not have to be abutted directly against the boundary and the apparatus does not have to be rotated to achieve close cutting up to the boundary.

The apparatus comprises one or more cutting members attached to a whirling disk at each head. The apparatus is most versatile for cutting around obstacles when these cutting members are flexible. Such flexible cutting members may be referred to as heavy strings. Alternatively, more rigid cutting members may be advantageously used to cut thicker vegetation.

Also pertinent to the instant invention are various features of the apparatus designed to improve the durability of the cutting strings or blades. The inventor has found that the two heads preferably rotate in opposite directions. This rotation may be accomplished with a crossed "V" belt to reverse rotation of one side. The inventor has also discovered that where two strings are mounted angularly close to one another on a whirling disk, or where both ends of a single string are used for cutting, the lead string or string end is preferably affixed further from the axis of the disk than the trailing string or string end. Alternatively, two strings may be attached to the whirling disk via a rotatably affixed member. Furthermore, a curved backing may trail each of the strings or string ends.

DESCRIPTION OF THE PREFERRED EMBODIMENTS

Figure 1:
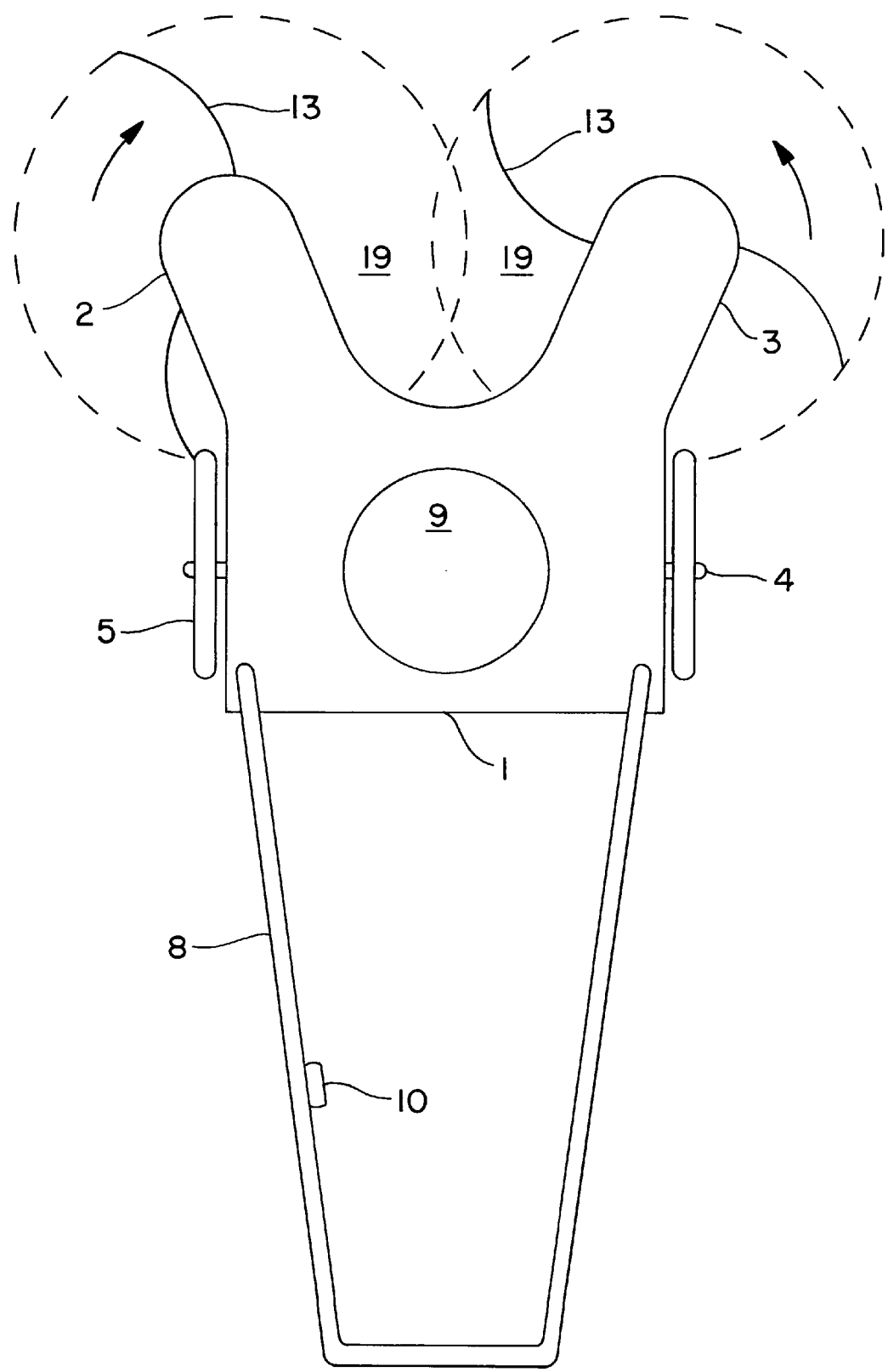
FIG. 1 is an overhead view of the apparatus.
Figure 2:
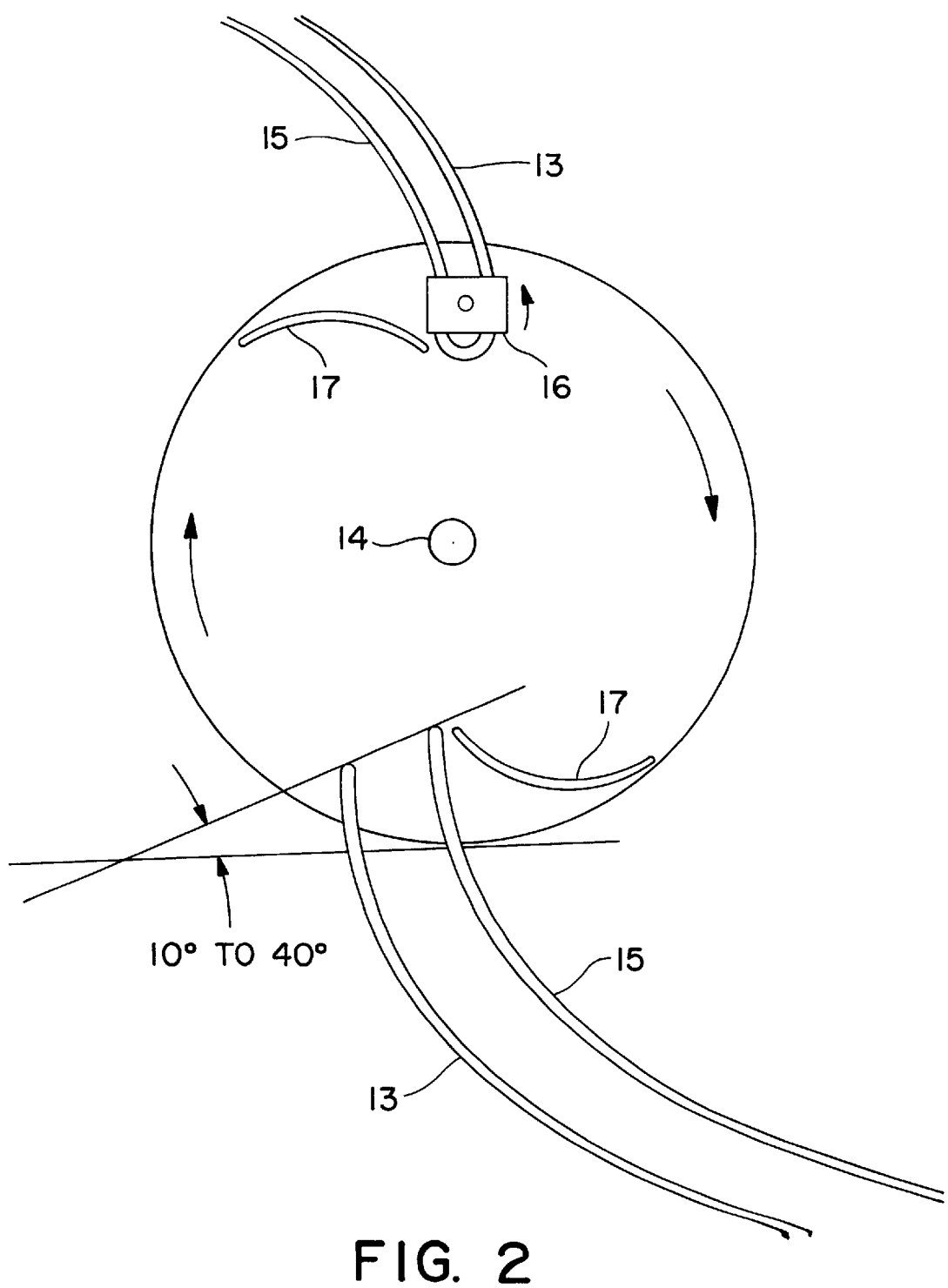
FIG. 2 represents a whirling disk of the apparatus.

The following description makes reference to the figures. The invention is a wheeled, motorized, rotary apparatus for cutting vegetation. It has a frame having a main body (1), a left front end (2), a right front end (3), and an underside. It includes and axle (4) mounted on and extending through the frame, with a wheel (5) mounted on each end of the axle. Mounted on the underside of the left front end of the frame is a first cutting head (6), and mounted on the underside of the right front end of the frame is a second cutting head (7). Each cutting head has a whirling disk and at least one cutting member (13). These cutting members are preferably flexible. These cutting members may be made of a wide variety of materials including steel wire, steel cable, polypropylene, high density polyethylene, fiberglass, polyurethane, and, preferably, fiberglass coated with polyurethane. A handle (8) is attached to the frame for maneuvering the apparatus. A motor (9) is attached to the frame for driving the first and second rotary cutting heads. Mounted on the handle and operatively connected to the motor is a throttle (10). In a preferred embodiment of the invention, a left arm (11) and a right arm (12) protrude forward from the main body of the frame, thereby creating a void (19) between the arms.

Further, the center of gravity of the apparatus is preferably just forward of the axle (4) to enhance maneuverability.

The whirling disks of the apparatus preferably have pairs of strings mounted near the perimeter of the disk. More preferably, the lead string (13) of each pair is mounted further from the axis (14) of the disk than the trailing string (15). The inventor has found that optimally a line passing through the two points where the strings are attached is at an angle between 10 and 40° with respect to a tangent of the disk. Alternatively, the two strings of the pair can be mounted to a rotationally affixed member (16). Further, a molded guide (17) may be used to ensure that the strings are prevented from bending in a tighter radius than the shape of the molded guide. This increases the life of the strings.

Figure 3:
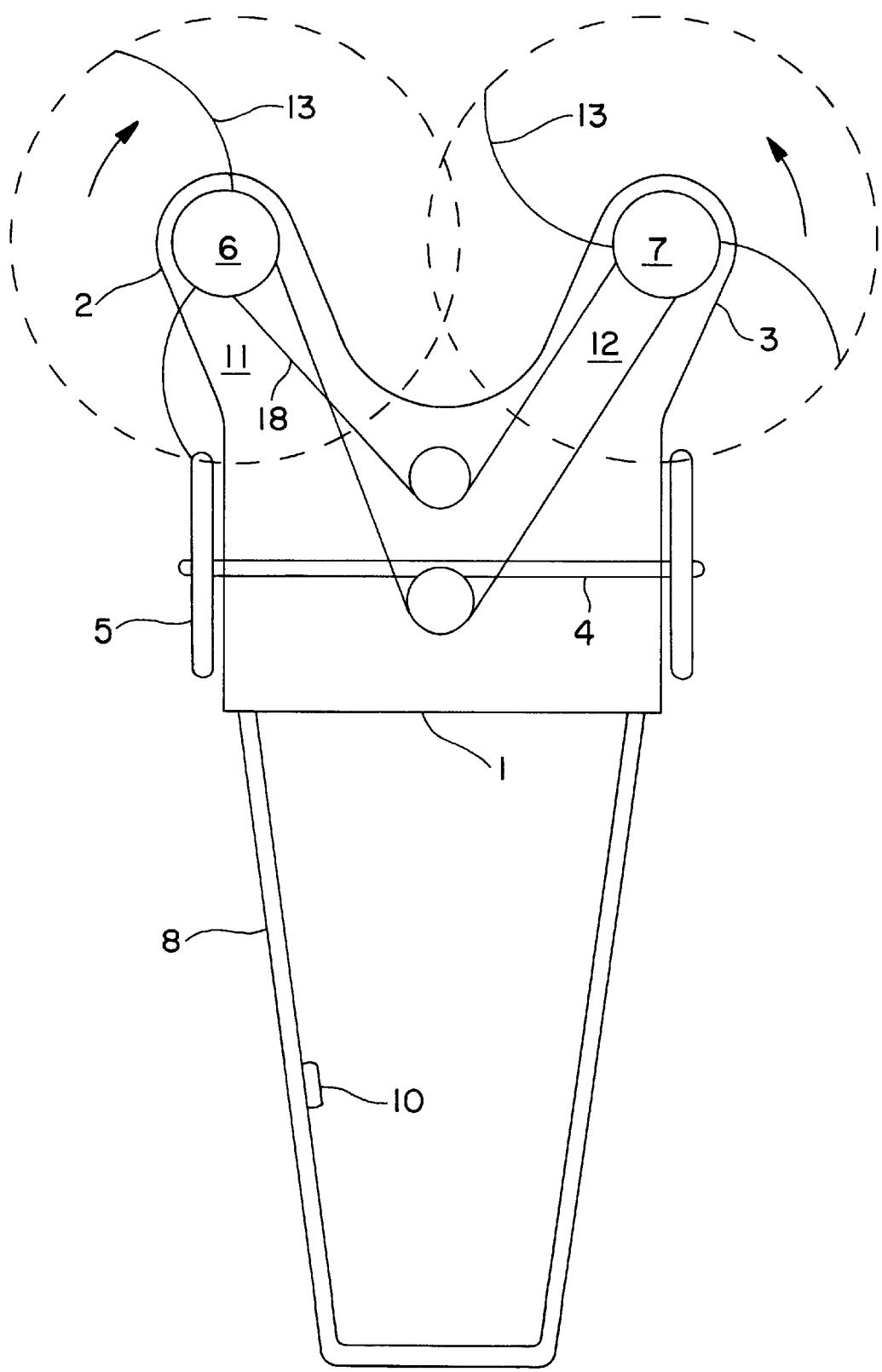
FIG. 3 is an underside view of the apparatus.

Advantageously, the apparatus uses a crossed "V" belt (18) to reverse rotation of one of the whirling disks. See FIG. 3.

I claim:

1. An apparatus for cutting vegetation, comprising:

A) a frame comprising a body, a left front end, and a right front end, wherein said body has a left side and a right side, and wherein each of said left front end and right front end has an underside;

B) a left wheel mounted on the left side of the body and a right wheel mounted on the right side of the body;

C) a first rotary cutting head mounted on the underside of the left front end; and D) a second rotary cutting head mounted on the underside of the right front end, said apparatus further comprising a left arm and a right arm, wherein the left arm connects the body to the left front end and the right arm connects the body to the right front end thereby creating a void between the left front end and the right front end.

2. The apparatus of claim 1 further comprising:

E) a handle attached to the body for maneuvering the apparatus;

F) a motor attached to the body for driving the first and second rotary cutting heads;

G) a throttle mounted on the handle and operatively connected to the motor.

3. The apparatus of claim 1, wherein the first and second rotary heads rotate in opposite direction during operation.

4. The apparatus of claim 2, wherein each of the first and second cutting heads comprises a whirling disk and a plurality of pairs of strings wherein each pair of strings is mounted to a member which is rotationally affixed to the whirling disk.

5. The apparatus of claim 2, wherein each of the first and second cutting heads comprises a whirling disk and a plurality of pairs of strings wherein each pair of strings comprises a leading string and a trailing string and the leading string is attached to the disk at a point further from the center of the disk than the trailing string.

6. The apparatus of claim 1, wherein each of the first and second cutting heads comprises a whirling disk and a plurality of pairs of strings wherein each pair of strings comprises a leading string and a trailing string and the leading string is attached to the disk at a point further from the center of the disk than the trailing string.

7. The apparatus of claim 4 wherein each of the first and second cutting heads further comprises a molded guide for the strings.

8. The apparatus of claim 3, wherein each of the first and second cutting heads comprises a whirling disk and a plurality of pairs of strings wherein each pair of strings comprises a leading string and a trailing string and the leading string is attached to the disk at a point further from the center of the disk than the trailing string.

9. The apparatus of claim 6, wherein each of the trailing string and the leading is attached to the whirling disk at a point, and wherein a line passing through the two points where the strings are attached is at an angle between 10 and 40°.

10. The apparatus of claim 8, wherein each of the trailing string and the leading is attached to the whirling disk at a point, and wherein a line passing through the two points where the strings are attached is at an angle between 10 and 40°.

11. The apparatus of claim 8 wherein each of the first and second cutting heads further comprises a molded guide for the strings.

12. The apparatus of claim 6 wherein each of the first and second cutting heads further comprises a molded guide for the strings.

* * * * *